United States Patent
Sano et al.

(10) Patent No.: US 8,553,500 B1
(45) Date of Patent: Oct. 8, 2013

(54) FLASHER TYPE FISH SONAR

(71) Applicant: Honda Electronics Co., Ltd., Toyohashi (JP)

(72) Inventors: Shuichi Sano, Toyohashi (JP); Yoshiki Katayama, Toyohashi (JP)

(73) Assignee: Honda Electronics Co., Ltd., Oiwa-cho, Toyohashi-shi, Aichi-ken (JP)

(*) Notice: Subject to any disclaimer, the term of this patent is extended or adjusted under 35 U.S.C. 154(b) by 0 days.

(21) Appl. No.: 13/688,950

(22) Filed: Nov. 29, 2012

(51) Int. Cl.
*G01S 7/64* (2006.01)
*G01S 15/96* (2006.01)

(52) U.S. Cl.
USPC .......................................................... 367/109

(58) Field of Classification Search
USPC .................... 367/109, 111; 345/56; 342/182
See application file for complete search history.

(56) References Cited

U.S. PATENT DOCUMENTS

| | | | | |
|---|---|---|---|---|
| 4,644,512 A | * | 2/1987 | Grilk | 367/111 |
| 5,057,827 A | * | 10/1991 | Nobile et al. | 345/31 |
| 5,999,490 A | * | 12/1999 | Shimauchi et al. | 367/111 |
| 6,650,595 B2 | * | 11/2003 | Asakura | 367/109 |
| 6,768,701 B1 | * | 7/2004 | Cummings et al. | 367/109 |

* cited by examiner

*Primary Examiner* — Daniel Pihulic
(74) *Attorney, Agent, or Firm* — Richard M. Goldberg

(57) ABSTRACT

A fish type sonar includes a signal transmitting portion having an output connected to an A/D converter, a timing generating portion having an output connected to the signal transmitting portion and the A/D converter, the A/D converter having an output connected to a first buffer memory, the first buffer memory having an output connected to a display signal transmitting portion and a sea bottom detecting portion, the sea bottom detecting portion having an output connected to a display data forming portion, the display data forming portion having an output connected to a second buffer memory, the second buffer memory having an output connected to the display signal transmitting portion, the display signal transmitting portion having an output connected to the display portion of the fish sonar and the portion for displaying the letters, the sea surface, the fish and the sea bottom.

8 Claims, 15 Drawing Sheets

FLASHER TYPE FISH SONAR

BACKGROUND OF THE INVENTION

The present invention relates a flasher type fish sonar for displaying data of fish sonar and for flashing letters.

In prior flasher type fish sonar, a display disk comprises a circular window formed at a front of a case, and a luminous body is mounted on a rotary disk opposite to the circular window. The rotary disk is rotated by a motor, slip rings are attached to a rotary shaft of the rotary disk, and brushes contact with the slip rings. An input circuit is connected to the brushes, a control circuit is connected to the input circuit, and an oscillating circuit and a receiving circuit are connected to the control circuit and an ultrasonic transducer.

When oscillating signals are input from the control circuit to the oscillating circuit, oscillating outputs are input from the oscillating circuit to the ultrasonic transducer, and ultrasonic waves are emitted from the ultrasonic vibrator to the water. Reflected ultrasonic waves from the water are received by the ultrasonic transducer, and reflected signals from the ultrasonic transducer are amplified by the receiving circuit and are input from the control circuit to the input circuit. By the reflected signals applied to the input circuit, luminous power is input to the luminous body through the brushes and slip rings from the input circuit. A portion A displayed on the circular window is a start point of a luminosity which shows a surface of the sea, a portion B shows fish, a portion C shows a first bottom echo of the sea, and a portion D shows a second bottom echo of the sea. When signals of letters are input by a keyboard, the control circuit converts the signals of letters to display signals which is input to an input device and letter signals are flashed from the circular window of the display board of the display device.

In the prior flasher type fish sonar, because the signals of the ultrasonic transducer of the fish sonar are displayed on the circular window of the display device and the letters signals are displayed on the same circular window of the display device, the display of the fish sonar and the display of letter signals are difficult to see. It is therefore desired that the display of the fish sonar and the display of the letter signals will be displayed at different portions of the display device.

SUMMARY OF THE INVENTION

It is, therefore, the primary object of the present invention to provide a flasher type fish sonar in which the sea surface, fish and sea bottom are displayed by lighting a plurality of Light Emitting Diodes (LEDs) mounted near of the edge of the rotary board at one or plural rows, and letters are displayed by lighting plural light emitting diodes mounted at an inside portion of the rotary board.

It is another object of the present invention to provide a flasher type fish sonar in which a shelter is so provided between the light emitting diodes for the fish sonar and light emitting diodes for letters that the emission from light emitting diodes for the fish sonar does not interfere with the emission from light emitting diodes for letters, and vice versa.

In order to accomplish the above and other objects, in the present invention, an ultrasonic transducer is connected to a signal transmitting portion and signal receiving portion, the output from the signal transmitting portion is connected to an A/D converter, the output from a timing generating portion is connected to the signal transmitting portion and the A/D converter, the output from the A/D converter is connected to a first buffer memory, the output from the buffer memory is connected to a display signal transmitting portion and a sea bottom detecting portion, the output from the sea bottom detecting portion is connected to a display data forming portion, the output from the display data forming portion is connected to a second buffer memory, the output from the second buffer memory is input to the display signal transmitting portion, the output of the display signal transmitting portion is input to the display portion of the fish sonar and the portion for displaying the letters, the sea surface, the fish and the sea bottom.

DESCRIPTION OF THE PREFERRED EMBODIMENTS

Figure 1:
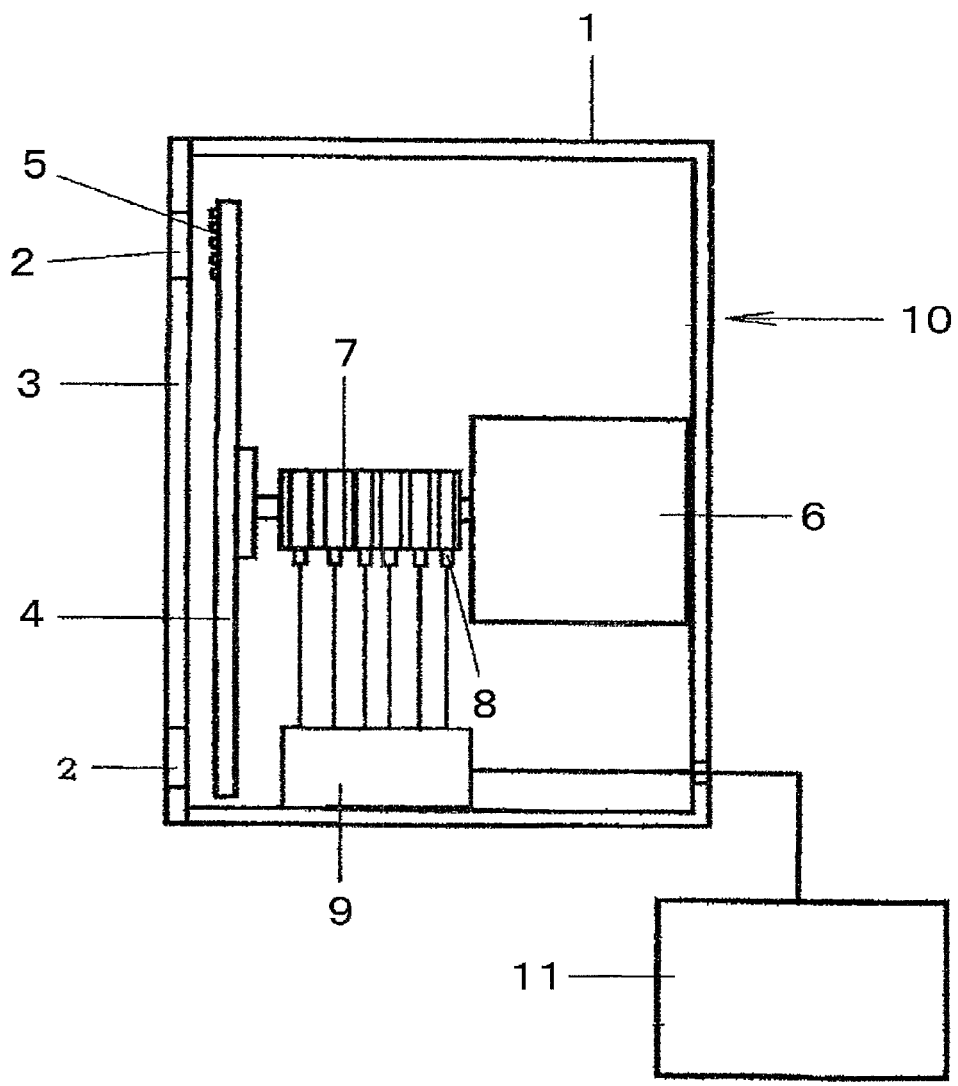
FIG. 1 shows a side view of a rotary disk of a prior flasher type fish sonar.
Figure 2:
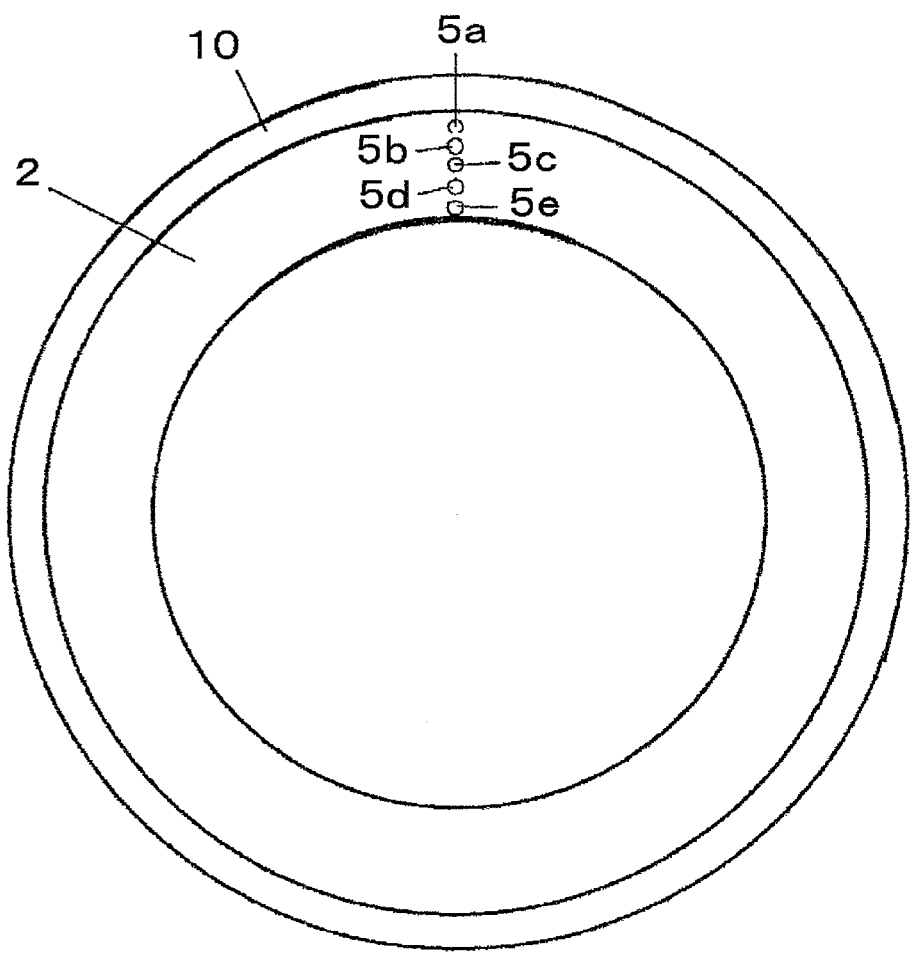
FIG. 2 shows a construction view of a display portion of a rotary disk of a prior flasher type fish sonar.
Figure 3:
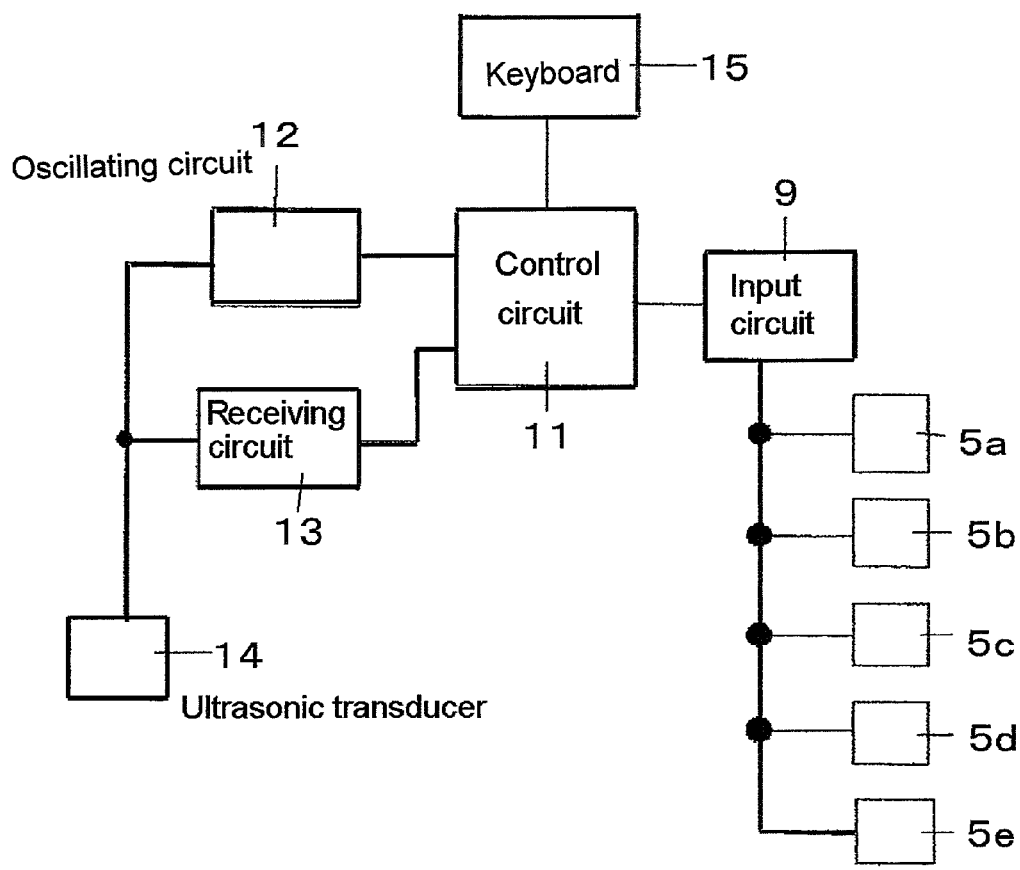
FIG. 3 shows a block diagram of a prior flasher type fish sonar.

In a prior flasher type fish sonar, as shown in FIG. 1 and FIG. 2, a display board 3 having a window 2 is formed at a front of a case 1, and light emitting diodes 5a, 5b, 5c, 5d and 5e are attached to a rotary disk 4 opposite to the window 2. The rotary disk 4 is rotated by a motor 6, slip rings 7 fixed to a rotary shaft of the rotary disk 4 are contacted with brushes 8 connected to an input circuit 9, and a display device 10 is constructed by the above constructions. Also, as shown in FIG. 3, a control circuit 11 is connected to the input circuit 9 in the display device 10. An oscillating circuit 12 and a receiving circuit 13 are connected to the control circuit 11.

Figure 4:
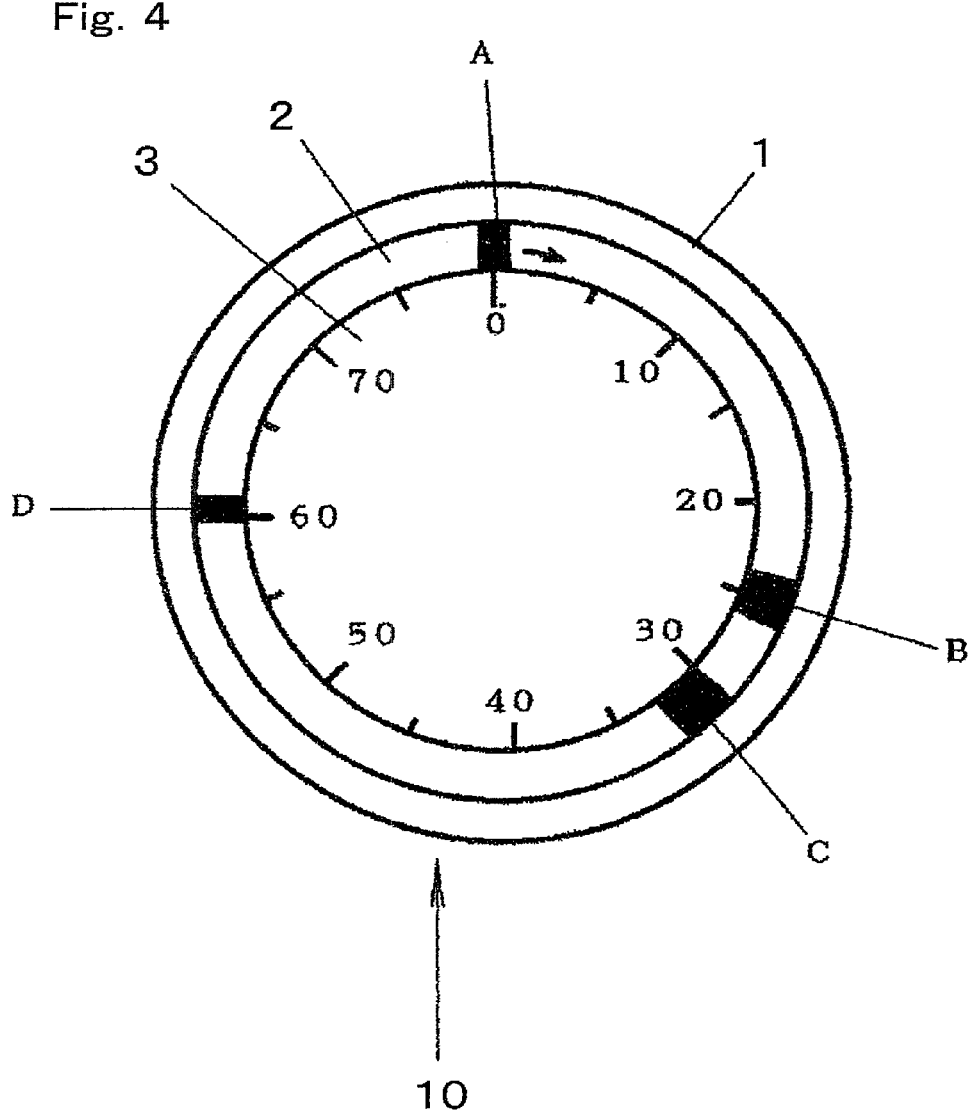
FIG. 4 shows a front view of a display device for displaying the fish sonar in the flasher type fish sonar.

When oscillating signals are input from the control circuit 11 to the oscillating circuit 12, oscillating outputs from the oscillating circuit 12 are input to an ultrasonic transducer 14, and ultrasonic waves from the ultrasonic transducer 14 are emitted through the sea. Reflected signals from the sea are amplified by a receiving circuit 13 and are input to the control circuit 11. The reflected signals input to the control circuit 11 are input through the input circuit 9, the brushes 8 and slip rings 7 to the light emitting diodes 5a, 5b, 5c, 5d and 5e. Thereby, as shown in FIG. 4, the light emitting diodes 5a, 5b, 5c, 5d become a start point as the portion A in the display device 10 which shows the sea surface, the portion B shows fish, the portion C shows the sea bottom, and portion D shows the second reflection of the sea bottom. Also, by inputting letter signals from a keyboard 15 to the control circuit 11, letter signals are converted to display signals by the control circuit 11 and are input to the input circuit 9, and are input to the light emitting diodes 5a, 5b, Sc, 5d and 5e, whereby the letters 17 are displayed in the window 2 of the display board 3 in the display device 10.

Figure 5:
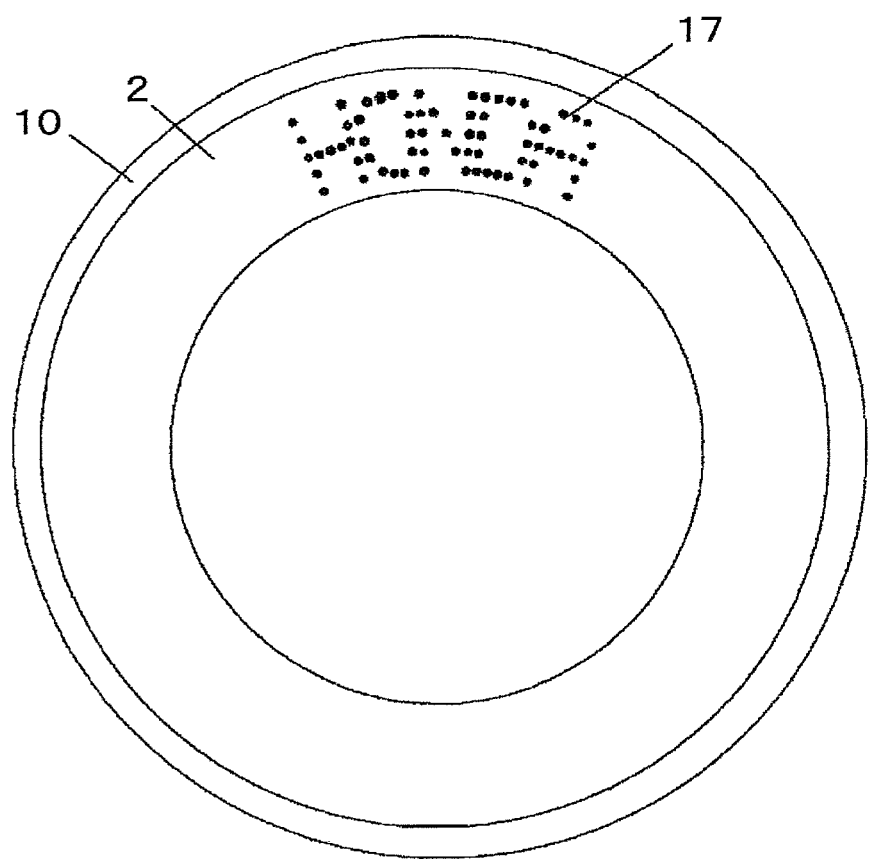
FIG. 5 shows a front view of a display device for displaying the letters.

However, in the prior flasher type fish sonar, since the signals from the ultrasonic transducer 14 and the signals of the letters are displayed at the same position of the display window on the display device 10, the displays of the fish sonar are difficult to see with the display of the letters, as shown in FIG. 5

Figure 6:
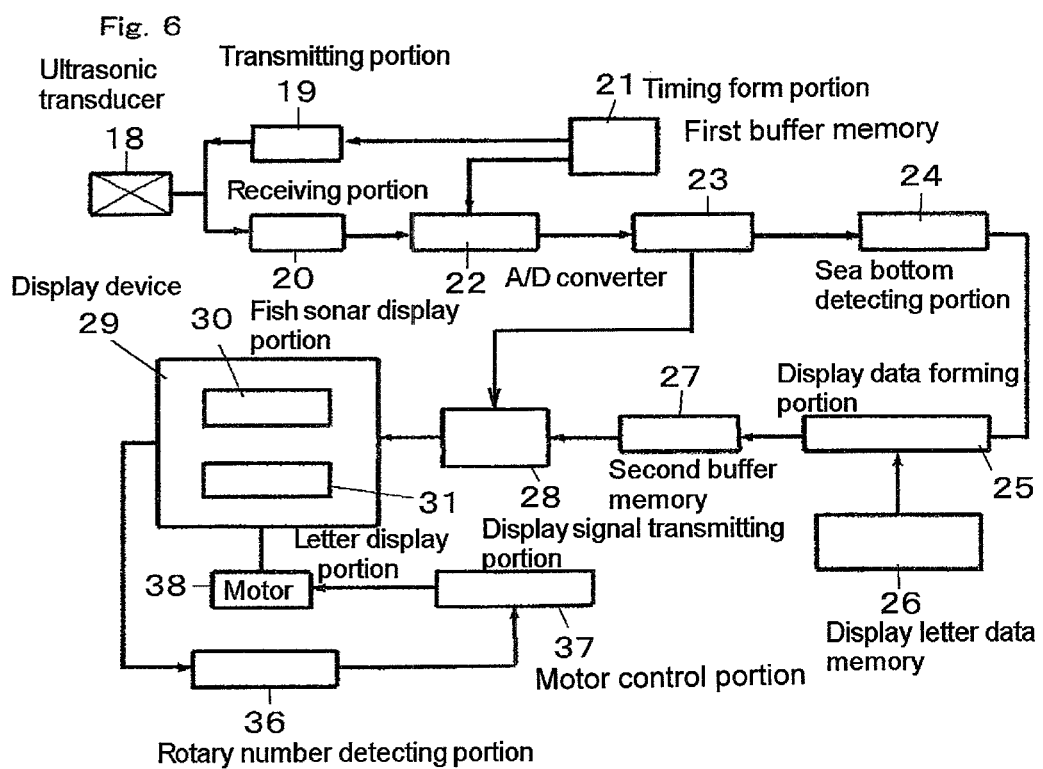
FIG. 6 shows a block diagram of a flasher type fish sonar according to the present invention.

FIG. 6 shows a block diagram of a flasher type fish sonar of the present invention. In the flasher type fish sonar, an ultrasonic transducer 18 is connected to a transmitting portion 19 and a receiving portion 20. A timing form portion 21 is connected to the transmitting portion 19, and an A/D converter 22 is connected to the receiving portion 20. The timing form portion 21 is connected to the A/D converter 22, the output from the A/D converter 22 is input to a first buffer memory 23, and the output from the first buffer memory 23 is input to a display signal transmitting portion 28 and a sea bottom detecting portion 24. Then, the output from the sea bottom detecting portion 24 is input to a display data forming portion 25 which is connected to a display letter data memory 26. The output from the display data forming portion 25 is input to a second buffer memory 27. The output from the second buffer memory 27 is input to display signal transmitting portion 28. The output from the display signal transmitting portion 28 is input to a fish sonar display portion 30 and a letter display portion 31 in a display device 29.

Figure 7:
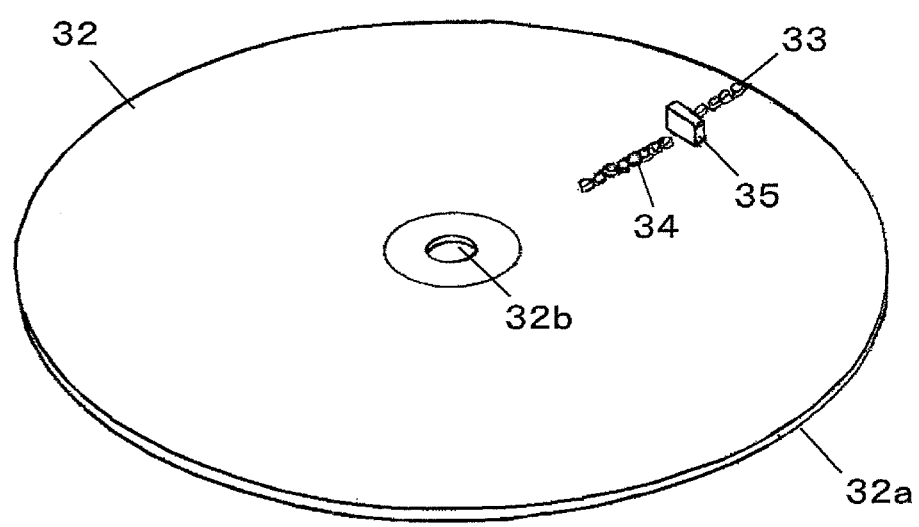
FIG. 7 shows a construction view of a display portion of a rotary disk of the flasher type fish sonar according to the present invention.
Figure 8:
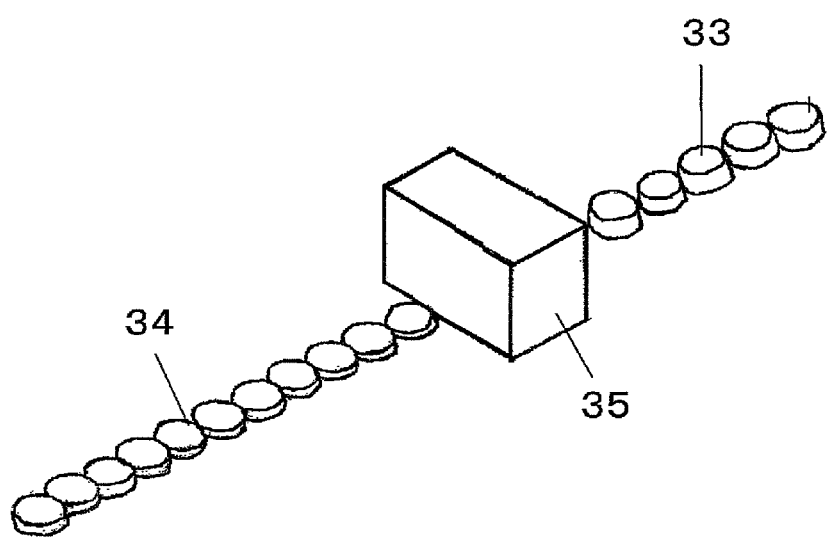
FIG. 8 shows an enlarged view of the rotary disk in the display device.

As shown in enlarged views in FIG. 7 and FIG. 8, the display device 29 comprises flasher fish sonar display portion 30 of display light emitting diodes 33 in one line near the edge 32a of the rotary disk 32 and letter display portion 31 of display light emitting diodes 34 in one line directed toward the center portion 32b of rotary disk 32. A light interrupting material 35 is mounted on the rotary disk 32 between the display light emitting diodes 33 and the display light emitting diodes 34. The rotation of rotary disk 32 of the display device 29 is detected by rotary number detecting portion 36, and the rotary number signals are input to a motor control portion 37. The motor control portion 37 controls a motor 38 for rotating the rotary disk 32.

Figure 9:
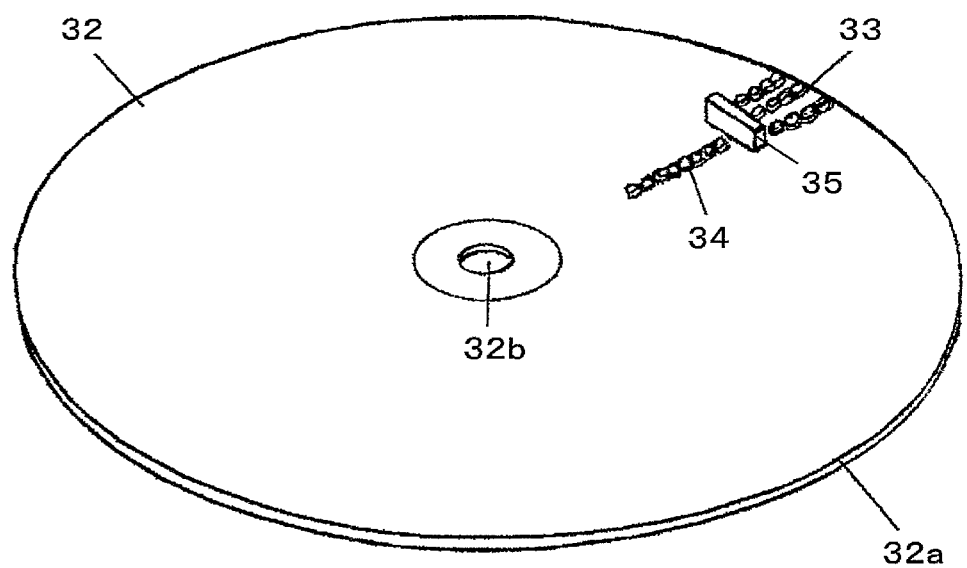
FIG. 9 shows a construction view of a rotary disk in the display device of a flasher type fish sonar according to another embodiment of the present invention.

In the flasher type fish sonar in the present invention, since the display light emitting diodes 33 are provided in one line near edge 32a of the rotary disk 32 and the display light emitting diodes 34 are provided in one line directed to the center of the rotary disk 32, when the timing signals from the timing form portion 21 are input to ultrasonic transducer 18, the ultrasonic waves from the ultrasonic transducer 18 are emitted to the sea. The reflected signals of fish sonar by the ultrasonic waves are amplified by the receiving portion 20, and the reflected signals are converted from analog signals to digital signals. The digital reflected signals of the fish sonar are memorized once by the buffer memory 23, and the digital reflected signals of the fish sonar read out from the buffer memory 23 are output to the display signal transmitting portion 28 and the sea bottom detecting portion 24. The output signals from the sea bottom detecting portion 24 are converted to display data by the display data forming portion 25 and are memorized by second buffer memory 27. The display data read out from the second buffer memory 27 are input to the display light emitting diodes 33 of the rotary disk 32 in the display device 29 with the reflected signals of fish sonar, as shown in FIG. 9, and the sea surface A, the fishes B, the sea bottom C and the second reflected signals D are displayed in the display light emitting diodes 33 of the rotary disk 32. At the same time that the fish sonar signals are displayed, because the letters data are output from the display letter data memory 26 to the display data forming portion 25, the letter data are transmitted from the display signal transmitting portion 28 to the display light emitting diodes 34, and the letter data 39 (FIG. 11) are displayed inside the display of fish sonar.

Figure 10:
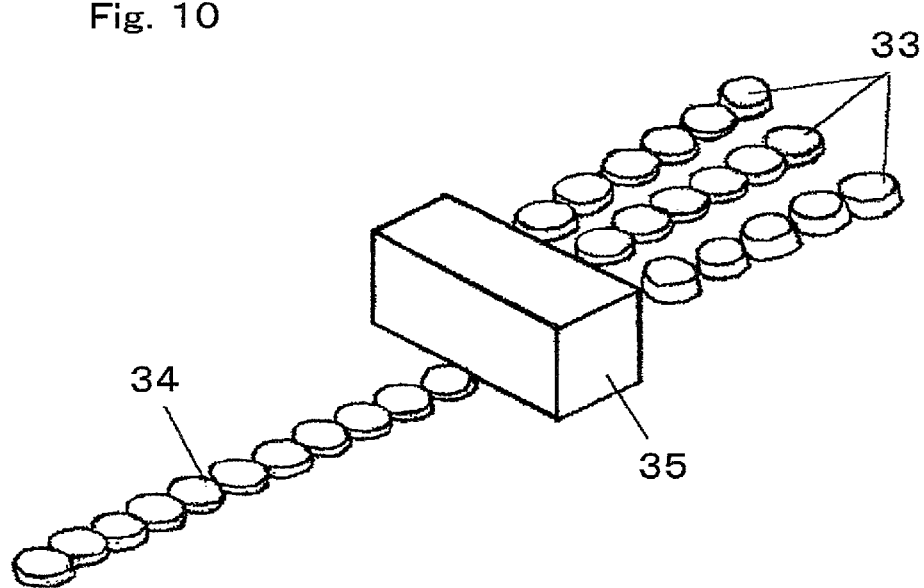
FIG. 10 shows an enlarged view a rotary disk of the display device.

As shown in enlarged views in FIG. 9 and FIG. 10, the display device 29 comprises a flasher sonar displaying portion 30 of display light emitting diodes 33 of three lines near the edge 32a of the rotary disk 32 and a letter displaying portion 31 of display light emitting diodes 34 of one line directed toward the center portion 32b of rotary disk 32. A light interrupting material 35 is mounted on the rotary disk 32 between the display light emitting diodes 33 and the display light emitting diodes 34. The rotation of rotary disk 32 of the display device 29 is detected by rotary number detecting portion 36. The rotary number signals are input to a motor control portion 37, and the motor control portion 37 controls a motor 38 for rotating the rotary disk 32.

In the present embodiment, the three lines of the display light emitting diodes 33 are mounted on the rotary disk 32, use color light emitting diodes, and changes display colors according to the strength of the signals of the fish sonar. For instance, the strong signal of the starting signal and the sea bottom are emitted by a red color, weak signals from fish are emitted by a green color, and a few strong signals are emitted by an orange color.

Figure 11:
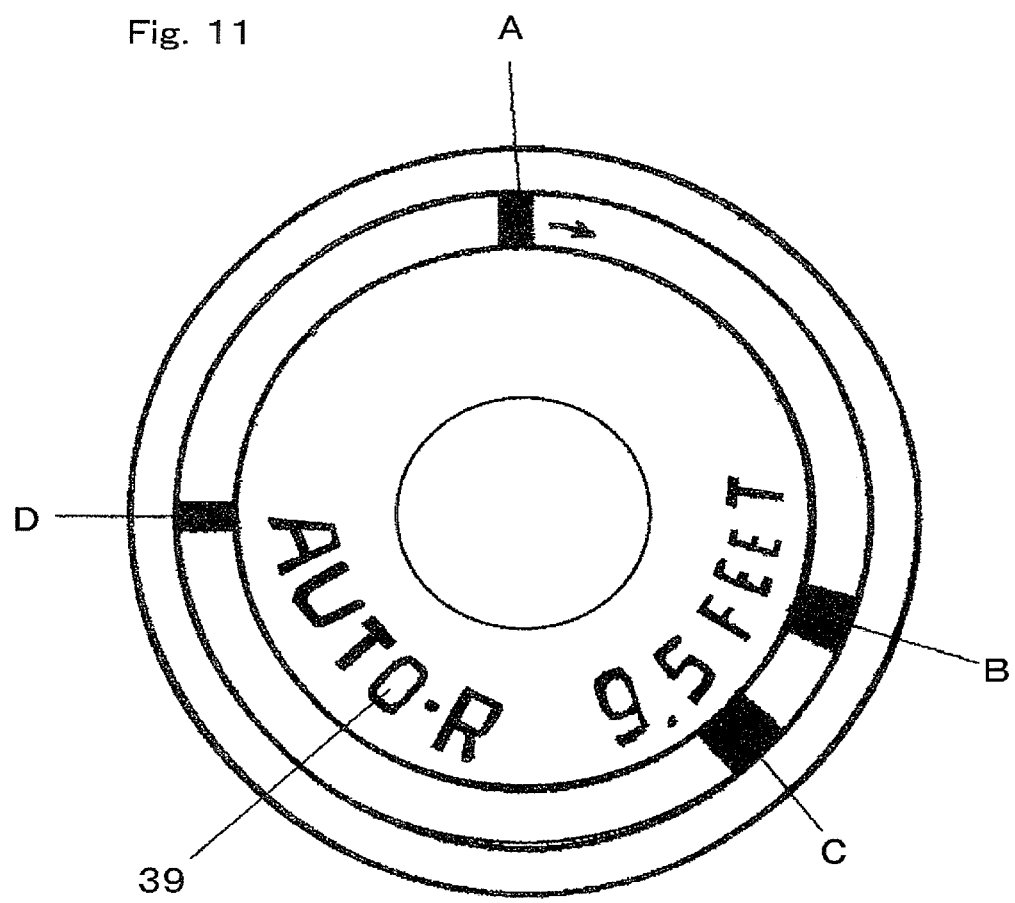
FIG. 11 shows a front view of display device in a flasher type fish sonar.

In the flasher type fish sonar as constructed above, when the display data read out from the second buffer memory 27 are input with the reflected signals of the fish sonar to the display light emitting diodes 33 by the display signal transmitting portion 28, as shown in FIG. 11, the sea surface A, the fish B, the sea bottom C, and the second reflect D from the sea bottom are shown. The letter data are output to the display data forming portion 25 from the display letter data memory 26 in the same manner as the signals of the fish sonar are displayed. Therefore, the letter data are displayed by the light emitting diodes 34, and the letter data 39 are displayed inside of the signals of fish sonar.

In the flasher type fish sonar in the present embodiment, the display of the signals of the fish sonar and the display of the letter data are displayed in the remote positions and the display of the signals of fish sonar and the display of the letter data are displayed on the same plane by the display light emitting diodes 33 and 34 of the rotary disk 32 in the display device 29. Therefore, because the display of signals of the fish sonar and the display of the letter data can be shown at the same time, the displays are easily seen. Because the light interrupting material 35 is mounted between the display light emitting diodes 33 for the fish sonar and the display light emitting diodes 34 for the letter data, light from the display light emitting diodes 33 and 34 do not leak into each other. The light from the display light emitting diodes 33 and 34 therefore do not interrupt the display of the other of the display light emitting diodes 33 and 34.

Figure 12:
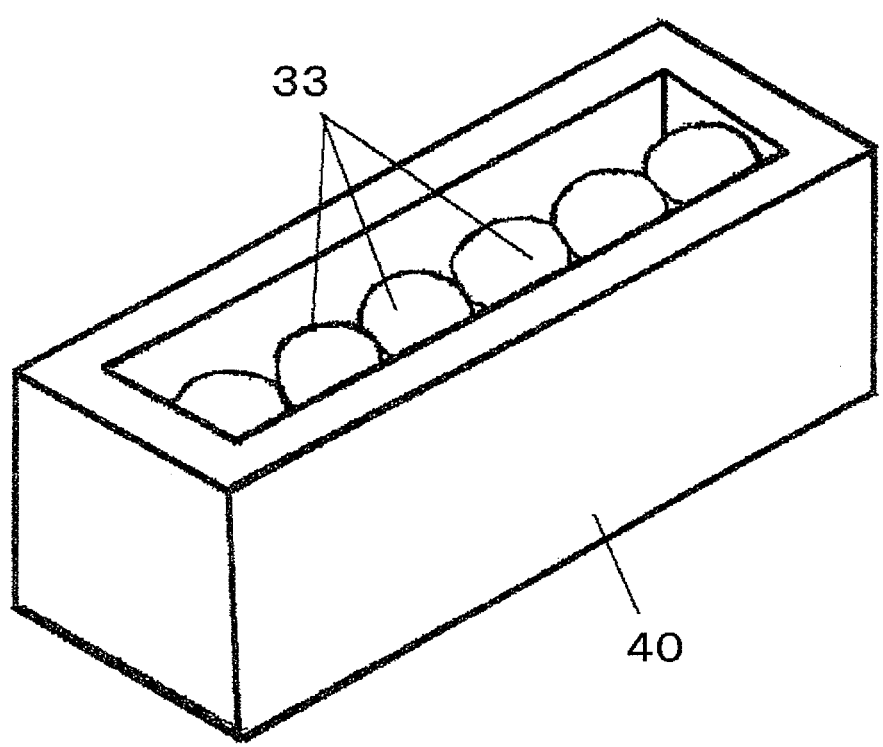
FIG. 12 shows an oblique view of an interrupt frame for enclosing the light emitting diode in the other embodiment of the present invention.
Figure 13:
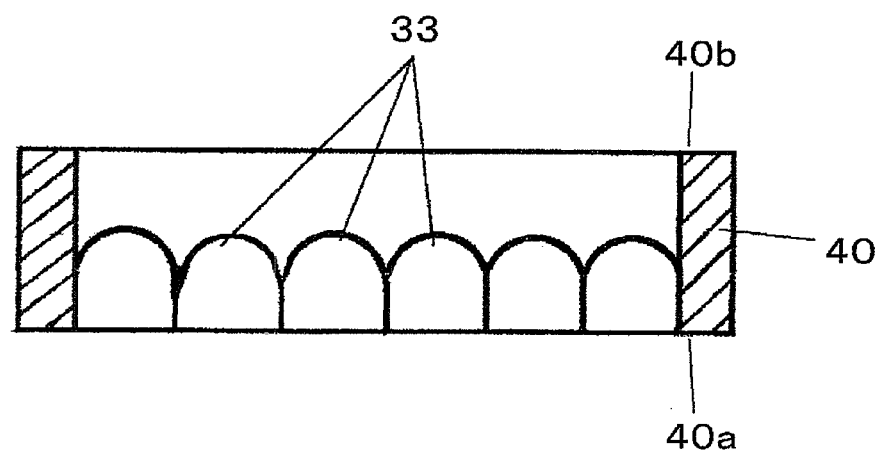
FIG. 13 shows a sectional view of the interrupt frame in FIG. 12.

FIG. 12 shows an oblique view of a light interrupt frame for enclosing the light emitting diodes in another embodiment of the present invention, and FIG. 13 shows a sectional view of the light interrupt frame in FIG. 12 in which the display light emitting diodes 33 are mounted in a light interrupting frame 40. In this case, it is necessary that the height of the display light emitting diodes 33 is lower than the height between the bottom surface 40a and upper surface 40b of the light interrupting frame 40. Because the display light emitting diodes 33 are mounted in the light interrupting frame 40, the light interrupting material 35 is not necessary.

Figure 14:
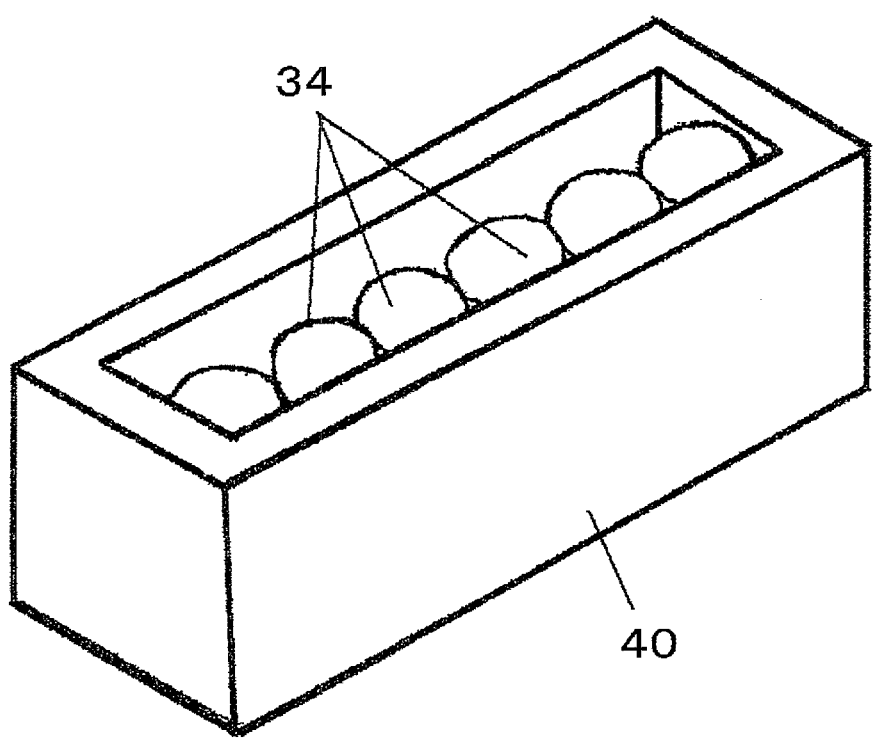
FIG. 14 shows an oblique view of an interrupt frame for enclosing the light emitting diode for fish sonar in the other embodiment of the present invention.
Figure 15:
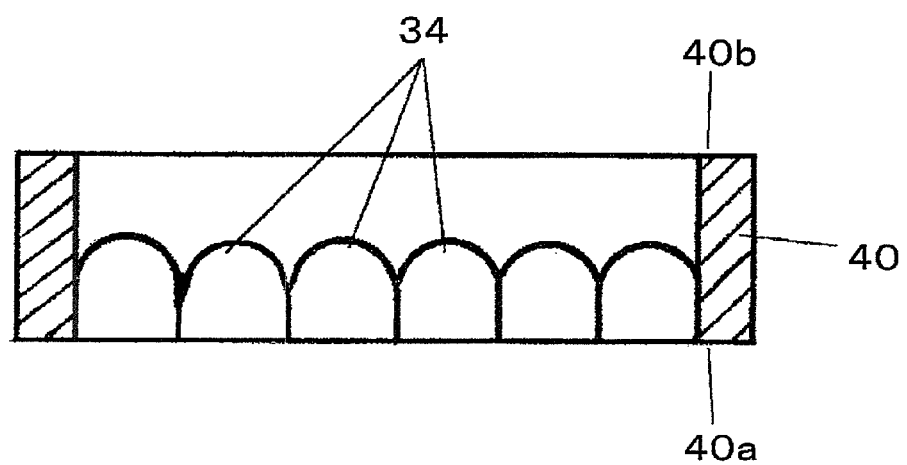
FIG. 15 shows a sectional view of the interrupt frame in FIG. 14.

FIG. 14 shows an oblique view of a light interrupt frame for enclosing the light emitting diodes 34 in the other embodiment of the present invention, and FIG. 15 shows a sectional view of the light interrupt frame in FIG. 14, in which the display light emitting diodes 34 are mounted in a light interrupting frame 40. In this case, it is necessary that the height of the display light emitting diodes 34 is lower than the height between the bottom surface 40a and upper surface 40b of the light interrupting frame 40. Because the display light emitting diodes 34 are mounted in the light interrupting frame 41, the light interrupting material 35 is not necessary.

What is claimed is:

1. A flasher type fish sonar comprises:
a timing form portion for outputting timing signals,
a transmitting portion for outputting transmitting signals in accordance with the timing signals from the timing form portion,
an ultrasonic transducer for emitting ultrasonic waves in the sea in accordance with the transmitting signals from the transmitting portion,
a receiving portion for amplifying reflected signals from the ultrasonic transducer,
an A/D converter for converting the amplified reflected signals from the receiving portion to digital signals,
a first buffer memory for storing once reflected signals from the A/D converter,
a sea bottom detecting portion for detecting the sea bottom by the reflected signals from the first buffer memory,
a display data forming portion for converting to display data the reflected signals from the sea bottom detecting portion,
a second buffer memory for storing the display signals from the display data forming portion,
a display letter data memory for inputting display letter data to the display data forming portion,
a display signal transmitting portion for transmitting the reflected signals from the first buffer memory and the display signals from the second buffer memory,
a fish sonar displaying portion mounted near an edge of a rotary disk rotated by a motor, and
a letter display portion including a plurality of light emitting diodes mounted near a center of the rotary disk,
wherein fish sonar are displayed by the fish sonar displaying portion, and the letter data are displayed by the letter display portion.

2. A flasher type fish sonar as set forth in claim 1 wherein the fish sonar displaying portion includes a plurality of fish sonar displaying light emitting diodes mounted in one line near an edge of the rotary disk,
wherein the plurality of letter displaying light emitting diodes are mounted in one line directed to a center of the rotary disk and radially inward from the fish sonar displaying light emitting diodes, and
further comprising a light interrupting material mounted between the fish sonar displaying light emitting diodes and the letter displaying light emitting diodes.

3. A flasher type fish sonar as set forth claim 1 wherein the fish sonar displaying portion includes a plurality of fish sonar displaying light emitting diodes mounted in plural lines near an edge of the rotary disk,
wherein a plurality of letter displaying light emitting diodes are mounted in one line directed to a center of the rotary disk and radially inward from the fish sonar displaying light emitting diodes, and
further comprising a light interrupting material mounted between the fish sonar displaying light emitting diodes and the letter displaying light emitting diodes.

4. A flasher type fish sonar as set forth claim 3 wherein the plural lines of the fish sonar displaying light emitting diodes include red, green and orange color light emitting diodes, such that strong reflected signals as a starting line and the sea bottom are emitted by the red light emitting diodes, weak reflected signals are emitted by the green light emitting diodes, and a strong reflected signals are emitted by the orange light emitting diodes.

5. A flasher type fish sonar as set forth claim 1 wherein the fish sonar displaying portion includes fish sonar displaying light emitting diodes attached to the rotary disk of a display device and which are mounted in a light interrupting frame.

6. A flasher type fish sonar as set forth claim 5 wherein a height of the fish sonar displaying light emitting diodes is lower than a height of a light interrupting frame.

7. A flasher type fish sonar as set forth claim 1 wherein the letter displaying light emitting diodes are attached to the rotary disk of a display device and are mounted in a light interrupting frame.

8. A flasher type fish sonar as set forth claim 7 wherein a height of the letter displaying light emitting diodes is lower than a height of a light interrupting frame.

* * * * *